United States Patent
Shirakawa et al.

(10) Patent No.: US 6,410,146 B2
(45) Date of Patent: Jun. 25, 2002

(54) CATIONIC ELECTRODEPOSITION COATING COMPOSITION

(75) Inventors: Shinsuke Shirakawa, Osaka-fu; Keisuke Tsutsui, Hyogo-ken; Mitsuo Yamada, Osaka-fu, all of (JP)

(73) Assignee: Nippon Paint Co., Ltd., Osaka-fu (JP)

( * ) Notice: Subject to any disclaimer, the term of this patent is extended or adjusted under 35 U.S.C. 154(b) by 0 days.

(21) Appl. No.: 09/754,140

(22) Filed: Jan. 5, 2001

(30) Foreign Application Priority Data

Jan. 7, 2000 (JP) ........................................ 2000-001435

(51) Int. Cl.$^7$ .......................... B32B 15/08; B32B 27/38

(52) U.S. Cl. ...................... 428/418; 204/489; 204/505; 204/506; 523/404; 523/406; 523/414; 523/415; 523/417

(58) Field of Search ................................ 523/402, 403, 523/404, 406, 414, 415, 417, 420; 204/489, 505, 506; 428/418

(56) References Cited

U.S. PATENT DOCUMENTS 5,451,305 A * 9/1995 Ott et al. .................. 204/181.7
5,936,012 A * 8/1999 Kaufman et al. ........... 523/404

* cited by examiner

*Primary Examiner*—Robert Dawson
*Assistant Examiner*—D. Aylward
(74) *Attorney, Agent, or Firm*—Wenderoth, Lind & Ponack, LLP

(57) ABSTRACT

A cationic electrodeposition coating composition is provided which contains blocked isocyanate curing agent which is blocked with a substance not recognized as a HAPs (hazardous atmospheric pollutant). The cationic electrodeposition coating composition of the present invention contains a cationic group-containing epoxy modified base resin and a blocked isocyanate curing agent, wherein said blocked isocyanate curing agent is obtained by reacting a polyisocyanate compound with, as a blocking agent, a terminal primary OH-containing propylene glycol monoalkyl ether and expressed by the formula $RO(CH(CH_3)CH_2O)_nH$ (where R is an alkyl group having 1 to 8 carbons, which may be branched, and n is 1 to 3).

4 Claims, No Drawings

CATIONIC ELECTRODEPOSITION COATING COMPOSITION

BACKGROUND OF THE INVENTION

1. Field of the Invention

The present invention relates to a cationic electrodeposition coating composition. In particular, it relates to a cationic electrodeposition coating composition which contains a curing agent that has been blocked with a terminal primary OH-containing propylene glycol monoalkyl ether.

2. Description of the Related Art

Blocked isocyanate curing agents are generally used in cationic electrodeposition coatings. The blocked isocyanate curing agents are obtained by reacting a polyisocyanate compound with a blocking agent which is reacted with the isocyanate groups and stable at ambient temperature, but can regenerate free isocyanate groups when heated to a dissociation temperature or higher. The blocking agents contain an active hydrogen and can be suitably selected according to the type of polyisocyanate compound to be employed.

However, the increasing level of awareness of environmental issues of late have been accompanied in developed countries by efforts to regulate the amounts of hazardous atmospheric pollutants (HAPs). Since the blocked isocyanate curing agents release blocking agents into the atmosphere when heated, the blocked isocyanate curing agents also need to be considered as a substance under HAPs as blocked by a substance which is considered as a HAPs. For example, conventionally used cationic electrodeposition coating compositions contain diphenyl methane diisocyanates (MDI) which are blocked with E-caprolactam and butyl cellosolve. Since both of the blocking agents are HAPs substances, there is the concern that their use is banned through enforcement of the environmental regulatory standards.

SUMMARY OF THE INVENTION

It is an object of the present invention to provide a cationic electrodeposition coating composition which contains a blocked isocyanate curing agent that has been blocked with a substance not recognised as a HAPs.

The cationic electrodeposition coating composition of the present invention contains an epoxy-modified base resin having a cationic group and a blocked isocyanate curing agent, wherein the blocked isocyanate curing agent is obtained by reacting a polyisocyanate compound with a terminal primary OH-containing propylene glycol monoalkyl ether as a blocking agent, as expressed by the formula $RO(CH(CH_3)CH_2O)_nH$ (where R is an alkyl group having 1 to 8 carbons, which may be branched, and n is 1 to 3). The polyisocyanate compound described above is e.g. diphenyl methane diisocyanate, and R in the formula for the propylene glycol monoalkyl ether is an n-butyl group and n is 1 to 2.

In addition, an article is coated using the cationic electrodeposition coating composition.

DESCRIPTION OF THE PREFERRED EMBODIMENTS

The cationic electrodeposition coating composition of the present invention contains an epoxy modified base resin having a cationic group and a blocked isocyanate curing agent.

The blocked isocyanate curing agent contained in the cationic electrodeposition coating composition of the present invention is obtained by reacting a polyisocyanate compound with a terminal primary OH-containing propylene glycol monoalkyl ether as a blocking agent, as expressed by the formula $RO(CH(CH_3)CH_2O)_nH$ (where R is an alkyl group having 1 to 8 carbons, which may be branched, and n is 1 to 3).

Examples of the polyisocyanate compound include alkylene diisocyanate, such as trimethylene diisocyanate, trimethyl hexamethylene diisocyanate, tetramethylene diisocyanate, and hexamethylene diisocyanate; cycloalkylene diisocyanate, such as bis(isocyanatomethyl) cyclohexane, cyclopentane diisocyanate, cyclohexane diisocyanate, and isophorone diisocyanate; aromatic diisocyanate, such as tolylene diisocyanate, phenylene diisocyanate, diphenylmethane diisocyanate, and diphenylether diisocyanate; aromatic/aliphatic diisocyanate, such as xylylene diisocyanate, and diisocyanate diethylbenzene; triisocyanate, such as triphenylmethane triisocyanate, triisocyanate benzene, and triisocyanate toluene; tetraisocyanate, such as diphenyl dimethyl methane tetraisocyanate; polymerized polyisocyanate, such as dimer or trimer of tolylene diisocyanate; and terminal isocyanate-containing compounds which are obtained by reacting the above polyisocyanate compounds with a low molecular active hydrogen-containing organic compound such as ethylene glycol, propylene glycol, diethylene glycol, trimethylol propane, hydrogenated bisphenol A, hexanetriol, glycerine, pentaerythritol, castor oil and triethanolamine; and the like.

On the other hand, the terminal primary OH-containing propylene glycol monoalkyl ether is a compound expressed by $RO(CH(CH_3)CH_2O)_nH$. In the formula, R is an alkyl group having 1 to 8 carbons, which may be branched. Specific examples of alkyl groups include methyl groups, ethyl groups, n-propyl groups, isopropyl groups, n-butyl groups, isobutyl groups, t-butyl groups, amyl groups, hexyl groups, octyl groups and 2-ethylhexyl groups. The number n is 1 to 3, but does not have to be an integer. A preferable formula for the propylene glycol monoalkyl ether has R as an n-butyl group and n being a number between 1 and 2.

The reaction between the polyisocyanate compound and the terminal primary OH-containing propylene glycol monoalkyl ether can be conducted using a well-known method. For example, the polyisocyanate compound is dissolved in a solvent which does not contain active hydrogen, then adding thereto a terminal primary OH-containing propylene glycol monoalkyl ether in an amount corresponding to the NCO equivalent in the polyisocyanate compound, in the presence of a urethanizing catalyst such as a tin compound, then heating the mixture and causing the reaction to occur. The reaction can be confirmed as having finished when the isocyanate group absorption spectrum has disappeared in an IR absorption spectrum.

The cationic group-containing epoxy modified base resin, which is another component contained in the cationic electrodeposition coating composition of the present invention, is manufactured by opening the epoxy rings in the starting material epoxy resin by bringing about a reaction with a mixture of a primary amine, secondary amine, tertiary amine acid salt or other amine, a sulfide and an acid. The term "cationic group" in the present specification shall refer to a group which is cationic in itself or a group rendered cationic by an addition of an acid. A typical example of the starting raw material resin is a polyphenol polyglycidyl ether epoxy resin formed from a reaction between bisphenol A, bisphenol F, bisphenol S, phenol novolac, cresol novolac or other polycyclic phenol compound and epichlorohydrin. Another example of the starting raw material resin is an oxazolidone ring-containing epoxy resin as taught in Japanese Patent Application Laid-open No. 5-306327. This epoxy resin is obtained by a reaction between a diisocyanate compound or a bisurethane compound obtained by blocking the NCO groups in a diisocyanate compound with methanol, ethanol or other lower alcohol, and epoxy groups.

The epoxy resin which is the starting raw material can be used after employing a bifunctional polyester polyol, polyether polyol, bisphenol or dibasic carboxylic acid for chain extension, prior to the epoxy ring-opening reaction brought about by the amine or sulfide. Similarly, in order to adjust the molecular weight or amine equivalent, or to improve the heat flow property, some epoxy rings of the epoxy resin may be reacted with 2-ethyl hexanol, nonyl phenol, ethylene glycol mono-2-ethyl hexyl ether, propylene glycol mono-2-ethyl hexyl ether or other monohydroxy compound, prior to the epoxy ring-opening reaction.

Examples of amines which can be used when opening the epoxy rings and introducing the amino groups include butylamine, octylamine, diethylamine, dibutylamine, methylbutylamine, monoethanolamine, diethanolamine, N-methylethanolamine, triethylamine acid salt, and N,N-dimethylethanolamine acid salt or other primary amine, secondary amine or tertiary amine acid salt. A ketimine blocked primary amino group-containing secondary amine such as amino ethyl ethanol amine methyl isobutyl ketimine may also be used. It is necessary for at least an equivalent amount of these amines to be reacted with the epoxy rings in order to open all of the epoxy rings.

Examples of sulfides include diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, and 1-(2-hydroxyethylthio)-3-butoxy-1-propanol. Examples of acids include formic acid, acetic acid, lactic acid, propionic acid, boric acid, butyric acid, dimethylolpropionic acid, hydrochloric acid, sulphuric acid, phosphoric acid, N-acetylglycine, N-acetyl-β-alanine and others.

If the starting material epoxy resin contains a hydroxyl group, then a self-crosslinkable epoxy modified based resin can be obtained by an addition reaction between the hydroxyl group and an isocyanate which has been half-blocked with the terminal primary OH-containing propylene glycol monoalkyl ether. The half-blocked isocyanate can be obtained by using the propylene glycol monoalkyl ether in an amount which corresponds to half of the NCO equivalent in the polyisocyanate compound in the manufacture of the blocked isocyanate curing agent.

It is preferable that a number average molecular weight of the cationic group-containing epoxy modified base resin is in the range of 600 to 4,000. A number average molecular weight of less than 600 decreases solvent resistance, corrosion resistance and other properties in the resulting coating film. Conversely, a number average molecular weight in excess of 4,000 not only makes the synthesis process difficult owing to the limited control over the resin solution viscosity, but also makes difficult a handling of the resulting resin during such procedures as emulsification dispersion. In addiction, since it has a high viscosity, the flow property during heating and curing would be adversely affected, which leads to markedly worse external appearance of the coating film. It is preferable that an amino value or sulfonium value of the cationic group-containing epoxy modified base resin is 30 to 150, and more preferably 45 to 120. Should the amino or sulfonium value fall below 30, it is more difficult for a stable emulsion to be obtained, while if the values exceed 150, drawbacks arise with Coulomb efficiency, redissolution and other electrodeposition coating-related operational considerations.

In the cationic electrodeposition coating composition of the present invention, it is preferred that a solid content weight ratio of the cationic group-containing epoxy modified base resin/the blocked isocyanate curing agent is 50/50 to 90/10, and more preferably 60/40 to 80/20. If the ratio falls outside these ranges, curing ability may be adversely affected.

The cationic electrodeposition coating composition of the present invention further contains a neutralizing acid in order to disperse the components in an aqueous medium. Examples of the neutralizing acids include formic acid, acetic acid, lactic acid, propionic acid, boric acid, butyric acid, dimethylolpropionic acid, hydrochloric acid, sulphuric acid, phosphoric acid, N-acetylglycine, N-acetyl-β-alanine and others. An amount of acid can vary with the amino group or sulfonium group content in the cationic electrodeposition coating composition, but it is preferable for the amount thereof to be sufficient to allow water dispersion.

The cationic electrodeposition coating composition of the present invention may additionally contain a pigment and a pigment dispersing resin. There is no particular limitation on the pigment, as long as it is a known pigment. Examples of the pigments include coloring pigment, such as titanium dioxide, carbon black and red iron oxide; extender pigment, such as kaolin, talc, aluminum silicate, calcium carbonate, mica, clay, and silica; corrosion resistant pigment, such as zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate and aluminum phosphomolybdate. A cationic or non-ionic low molecular weight surfactant and modified epoxy resins which generally contain quaternary ammonium groups and/or tertiary sulfonium groups can be used as the pigment dispersing resin.

The pigment dispersing resin and pigment are mixed in a prescribed amount by using a ball mill, sand grinding mill or other known dispersing device until predetermined particle sizes have attained uniformly to obtain a paste in which the pigment has been dispersed. The pigment-dispersed paste can be used as long as the pigment in the cationic electrodeposition coating composition constitutes 0–50 wt % of the solid content.

The cationic electrodeposition coating composition of the present invention can be prepared by adding a neutralizing acid to a mixture of an epoxy modified base resin having a cationic group and a blocked isocyanate curing agent to disperse in an aqueous medium, and then adding a pigment dispersed paste thereto. An additive, such as surfactant, antioxidant, UV absorbing agent, curing accelerator may be added to the system as needed, at the desired stages.

In the present invention, the cationic electrodeposition coating composition is coated on an article. The article can be one that is subjected to electrodeposition. The cationic electrodeposition coating can be performed according to a known method. Typically, the cationic electrodeposition coating composition is diluted with deionized water to a solid content of 5 to 40 wt % and preferably 15 to 25 wt %, to form an electrodeposition bath containing the cationic electrodeposition coating composition having a pH range of 5.5 to 8.5. Electrodeposition can be conducted at a temperature of 20 to 35° C. and a voltage of 100 to 450 V.

A thickness of a film produced by electrodeposition coating can preferably be 5 to 40 μm when dried, and more preferably 10 to 30 μm. It is preferable to control conditions for electrodeposition coating so as to obtain the above mentioned thickness range. It is appropriate for the coating film to be baked at 100 to 220° C., and preferably at 140 to 200° C. for 10 to 30 minutes.

The electrocoated article may be further coated with an intermediate coat or a top coat. The intermediate coat and top coat can be applied by art known methods from paint and coating conditions as used for a surface of automobiles.

EXAMPLES

"Parts" as referred to in the following shall denote "weight parts".

Manufacturing Example 1
Manufacturing the Cationic Group-containing Epoxy Modified Base Resin In to a flask equipped with a stirrer, a cooling tube, a nitrogen introduction tube, a thermometer, and a dropping funnel, 92 Parts of 2,4-/2,6-tolylene diisocyanate (weight ratio=8/2), 95 parts of methyl isobutyl ketone ("MIBK" below) and 0.5 parts of dibutyltin laurate were introduced, to which 21 parts of methanol was added dropwise under stirring. The reaction temperature began at room temperature and then increased to 60° C. by generation of heat. The reaction was then continued for 30 minutes, to which 57 parts of ethylene glycol mono-2-ethyl hexyl ether was added dropwise via a dropping funnel. Further, 42 parts of 5-mol bisphenol A-propylene oxide adduct was added to the reaction mixture. The reaction was primarily conducted at 60 to 65° C. and was continued until IR spectrographic assessment revealed the absorption due to the isocyanate groups had disappeared.

Next, 365 parts of epoxy resin having an epoxy equivalent of 188, which had been synthesised from bisphenol A and epichlorohydrin using a known method, was added in to the blocked isocyanate so obtained, and the temperature was raised to 125° C. Then, 1.0 part of benzyldimethylamine was added thereto and the reaction carried out at 130° C. until an epoxy equivalent of 410 parts of had been attained. Thereafter, 87 parts of bisphenol A was added and the reaction carried out at 120° C., whereupon an epoxy equivalent of 1190 had been attained. The reaction mixture was then cooled, after which 11 parts of diethanol amine, 24 parts of N-ethyl ethanol amine and 25 parts of ketimined aminoethylethanolamine (79 wt % MIBK solution) were added thereto and the reaction carried out at 110° C. for two hours. Diluting the mixture with MIBK to bring a non-volatile content to 80% resulted in a cationic group-containing epoxy modified base resin having a glass transition point of 22° C.

Manufacturing Example 2
Manufacturing the Pigment-dispersed Paste

Into a flask fitted with a stirrer, a cooling tube, a nitrogen introduction tube, a thermometer and a dropping funnel, 222.0 parts of isophorone diisocyanate ("IPDI" below) was introduced and diluted with 39.1 parts of MIBK, to which 0.2 parts of dibutyltin dilaurate was added. The temperature of the mixture was raised to 50° C., to which 131.5 parts of 2-ethyl hexanol was added dropwise over two hours in a dry nitrogen atmosphere under stirring. By cooling the mixture appropriately, the reaction temperature was maintained at 50°C. 2-ethyl hexanol-half-blocked IPDI was thereby obtained (90.0% solid resin content).

Next, 87.2 parts of dimethylethanolamine, 117.6 parts of 75% aqueous lactic acid solution and 39.2 parts of ethylene glycol monobutyl ether were successively added into a suitable reaction vessel and stirred together for approximately 30 minutes at 65° C. to yield a quaternising agent.

Next, 710.0 parts of Epon 829 (bisphenol A-type epoxy resin; epoxy equivalent: 193 to 203; Shell Chemical Company) and 289.6 bisphenol A were introduced into a suitable reaction vessel and heated in a nitrogen atmosphere at 150 to 160°C. to cause an initial exothermic reaction. The reaction was carried out in the reaction mixture for approximately one hour at 150 to 160° C., after which the reaction mixture was cooled to 120° C., to which 498.8 parts of the 2-ethyl hexanol half-blocked IPDI (MIBK solution) preliminary prepared was added.

The reaction mixture was maintained at 110 to 120° C. for approximately 1 hour, to which 1390.2 parts of ethylene glycol monobutyl ether was added. The mixture was then cooled to 85 to 95° C. and once it had achieved a uniform state, 196.7 parts of the quaternising agent prepared above was added thereto. The reaction mixture was kept at 85 to 95° C. until the acid value had reached 1, and then 37.0 parts of deionized water was added thereto, and once the quaternarization in the epoxy-bisphenol A resin had been stopped, a pigment dispersing resin varnish which contained a quaternary ammonium salt moiety was obtained (50% solid resin content).

60.0 Parts of pigment dispersing resin varnish (epoxy-based quaternary ammonium salt pigment dispersing resin) in a solid state, 2.0 parts of carbon black, 100.0 parts of kaolin, 80.0 parts of titanium dioxide, 18.0 parts of aluminum phosphomolybdate and deionized water in an amount sufficient to bring the pigment paste solid content to 48% were introduced into a sand grinding mill and allowed to disperse therein until the particle sizes were no greater than 10 μm. A pigment-dispersed paste was thereby obtained.

Manufacturing Example 3
Manufacturing the Blocking Agent which has been Blocked with a Terminal Primary OH-containing Propylene Glycol Monoalkyl Ether Into a reaction vessel, 1,000 parts of diphenylmethane diisocyanate and 288.5 parts of MIBK were introduced, and heated to 80° C., followed by adding 1.0 part of dibutyltin dilaurate thereto. Next, 1,596.8 parts of NBP-10 (Sanyo Kasei Co., Ltd.; terminal primary OH-containing propylene glycol monoalkyl ether) was added dropwise thereto over two hours at 80° C. The mixture was heated for one hour at 100° C., and it was confirmed that absorption due to the isocyanate groups had disappeared. The mixture was cooled to yield a blocked isocyanate curing agent.

Manufacturing Example 4
Manufacturing the Blocked Isocyanate Curing Agent

Into a reaction vessel, 1,250 parts of diphenylmethane diisocyanate and 266.4 parts of MIBK were introduced and were heated to 80° C., to which 2.5 parts of dibutyltin dilaurate was added. A solution containing 226 parts of ε-caprolactam dissolved in 944 parts of butyl cellosolve was then added dropwise thereto at 80° C. for 2 hours. After heating the mixture for a further 4 hours at 100° C., IR spectrographic assessment was used to confirm that absorption due to the isocyanate groups had disappeared. The mixture was allowed to cool, after which 336.1 parts of MIBK was added thereto to yield a blocked isocyanate curing agent.

Example

Manufacturing the Cationic Electrodeposition Coating Composition

The cationic group-containing epoxy modified base resin obtained in Manufacturing Example 1 and the blocked isocyanate curing agent obtained in Manufacturing Example 3 were mixed together until uniform, with a solid content ratio of 70/30. Next, ethylene glycol-2-ethyl hexyl ether was added so as to obtain a solid content of 3 wt %. Glacial acetic acid was added thereto until a 45% neutralization had been attained, and the mixture was further diluted by the gradual addition of deionized water. An emulsion with a solid content of 36% was obtained by removing the MIBK under a reduced pressure.

1,697 Parts of emulsion, 393.9 parts of pigment-dispersed paste as obtained in Manufacturing Example 3, 1,889.6 parts of ion-exchange water, and 19.5 parts of dibutyltin oxide were mixed together, resulting in a cationic electrodeposition coating composition having a 20 wt % solid content. The ratio of pigment to solid resin content in the cationic electrodeposition coating composition was 1/4.5.

Comparative Example

A cationic electrodeposition coating composition was obtained as described in Example, with the exception that the blocked isocyanate curing agent obtained in Manufacturing Example 4 was used instead of the blocked isocyanate curing agent obtained in Manufacturing Example 3.

The cationic electrodeposition coating compositions obtained in the Example and Comparative Example were baked to form cationic electrodeposition coating films, which were subjected to the evaluation tests below. The results of the tests are displayed in Table 1.

(Corrosion Resistance During Immersion in Salt Water)

The cationic electrodeposition coating compositions were electrodeposited on zinc phosphate-treated plates made from cold rolled steel such that the dried films were 20 μm thick. Cationic electrodeposition coating films obtained by baking these for 25 minutes at 170° C. were immersed for 240 hours at 55° C. in 5% salt water, and thereafter a portion of each was cut and peeled off as a tape. The peeling widths of both sides of the cut portions were assessed against the following criteria:

○: <3 mm

Δ: 3to 6 mm

"X" mark: >6 mm (Gel Content)

Electrodeposition coating compositions were electrodeposited on tin plates which had been weighed beforehand to a thickness of 20 μm, and these were baked under prescribed conditions. The resulting coated plates were weighed, then immersed in acetone for 6 hours under reflux, and then dried for 20 minutes at 105 to 110° C. After drying, a weight of the coated plates was measured. The gel content was calculated according to the formula below:

Gel content $(\%)=(W2-W0)/(W1-W0)\times 100$ where:

W0: a weight of tin plate

W1: a weight of coated plates after baking

W2: a weight of coated plates after immersion in acetone.

TABLE 1

| | | | Working Example | Comparative Example |
|---|---|---|---|---|
| Corrosion resistance during immersion in salt water (mm) | | | ○ | ○ |
| Gel content (%) | Baking conditions | 160° C. × 20 min | 95 | 93 |
| | | 170° C. × 20 min | 93 | 94 |
| | | 180° C. × 20 min | 91 | 92 |

The above results confirm that blocked isocyanate curing agents which are obtained through a reaction with a terminal primary OH-containing propylene glycol monoalkyl ether as a blocking agent exhibit performance which is not inferior to conventional curing agents.

Since the cationic electrodeposition coating composition of the present invention uses a terminal primary OH-containing propylene glycol monoalkyl ether as a blocking agent in a blocked isocyanate curing agent, coating films can be obtained in which curing reactivity is improved, and which possess similar properties to conventional films.

Moreover, the blocking agent which is dispersed in the cationic electrodeposition coating composition of the present invention is not recognised as an HAPs, and adverse effects on the environment can therefore be minimised.

What is claimed is:

1. A cationic electrodeposition coating composition, comprising a cationic group-containing epoxy modified base resin and a blocked isocyanate curing agent, wherein the blocked isocyanate curing agent is obtained by reacting a polyisocyanate compound with a terminal primary OH-containing propylene glycol monoalkyl ether as a blocking agent, wherein the terminal primary OH-containing propylene glycol monoalkyl ether has the formula:

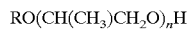

RO(CH(CH$_3$)CH$_2$O)$_n$H and wherein R is an alkyl group having 1 to 8 carbons which is branched or straight and n is 1 to 3.

2. The cationic electrodeposition coating composition according to claim 1, in which said polyisocyanate compound is diphenylmethane diisocyanate, and R in the formula is a n-butyl group and n is 1 to 2.

3. An electrodeposition-coated article, which is coated using the cationic electrodeposition coating composition according to claim 1.

4. An electrodeposition-coated article, which is coated using the cationic electrodeposition coating composition according to claim 2.

* * * * *